United States Patent
Cronjé

[11] Patent Number: 6,164,067
[45] Date of Patent: Dec. 26, 2000

[54] KNUCKLE JOINT FOR AN EXHAUST SYSTEM

[76] Inventor: Jacobus Cronjé, 2 Fuchsia Close, Plattekloof Extension 11 Parow 7500, South Africa

[21] Appl. No.: 09/391,245

[22] Filed: Sep. 7, 1999

Related U.S. Application Data

[63] Continuation of application No. PCT/GB98/00694, Mar. 9, 1998.

[30] Foreign Application Priority Data

Mar. 7, 1997 [ZA] South Africa ............ 97/2002

[51] Int. Cl.$^7$ ...................................... F01N 7/00
[52] U.S. Cl. .............. 60/322; 60/323; 60/272; 285/263; 285/268; 285/269
[58] Field of Search .............. 60/322, 323, 272; 285/261, 263, 268, 269

[56] References Cited

U.S. PATENT DOCUMENTS

| | | | |
|---|---|---|---|
| 4,132,437 | 1/1979 | Green | 285/263 |
| 4,659,091 | 4/1987 | Baasner et al. | 277/1 |
| 4,856,822 | 8/1989 | Parker | 285/62 |
| 4,871,181 | 10/1989 | Usher et al. | 277/229 |
| 5,040,805 | 8/1991 | Ozora | 277/235 R |
| 5,374,086 | 12/1994 | Higgins | 285/111 |
| 5,661,976 | 9/1997 | Clanton | 60/322 |
| 5,683,119 | 11/1997 | Emmons et al. | 285/167 |

FOREIGN PATENT DOCUMENTS

| | | |
|---|---|---|
| 2449840 | 2/1979 | France . |
| 2522726 | 3/1982 | France . |
| 195 08 979 A1 | 11/1995 | Germany . |

*Primary Examiner*—Thomas Denion
*Assistant Examiner*—Binh Tran
*Attorney, Agent, or Firm*—Wood, Herron & Evans, L.L.P.

[57] ABSTRACT

A knuckle joint 18 for the exhaust system of an internal combustion engine comprises first and second pipe segments 20, 22, the second pipe segment having an outwardly deformed end portion 24 which enters with clearance into a flared end portion 26 of the first pipe segment. There is a flange 32 on the first pipe segment and a flange 34 on the second pipe segment. A plurality of circumferentially spaced bolts 36 pass through corresponding holes in the flanges, there being a nut 40 on each of the bolts. On each bolt there is a coil spring 38 between the flanges, and a coil spring 42 between the flange 32 and the nut.

7 Claims, 2 Drawing Sheets

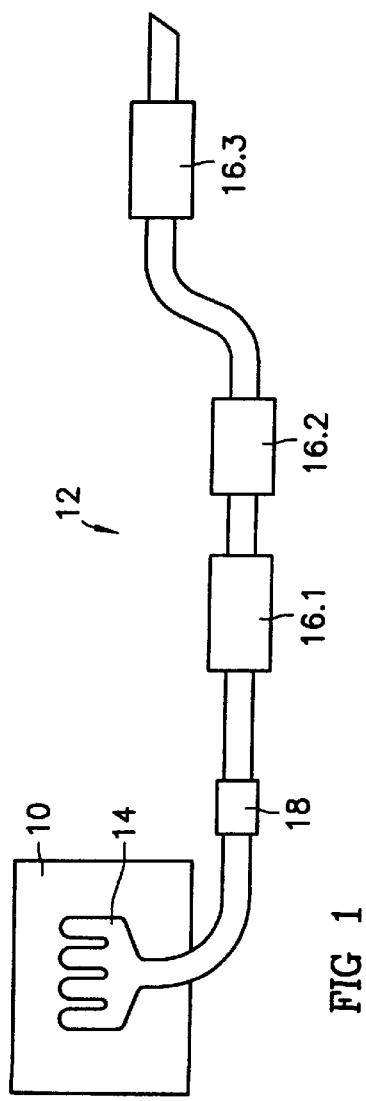
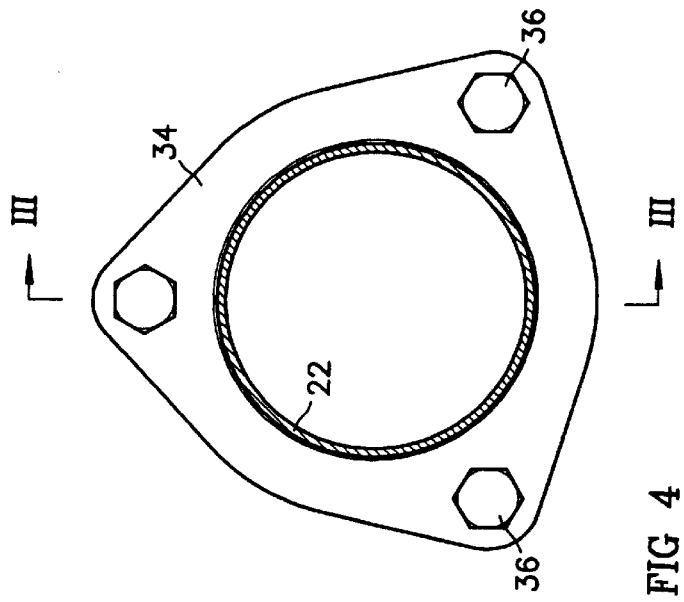
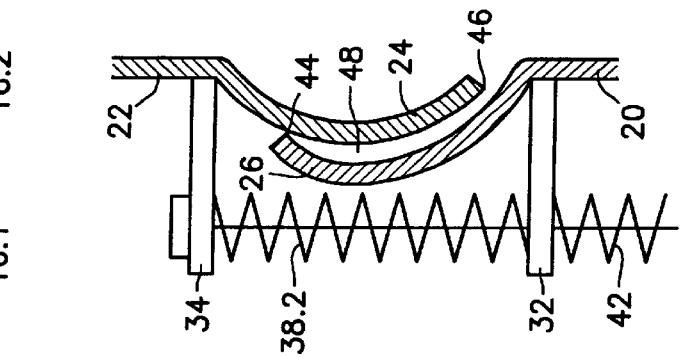
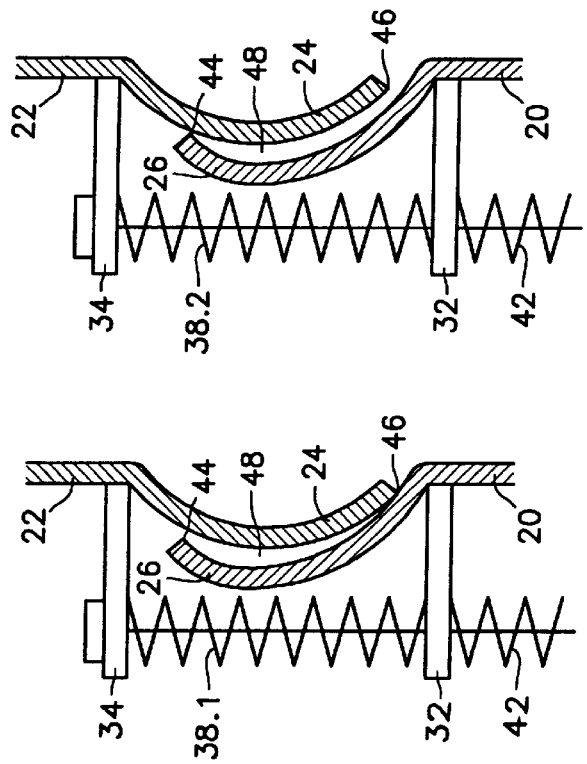

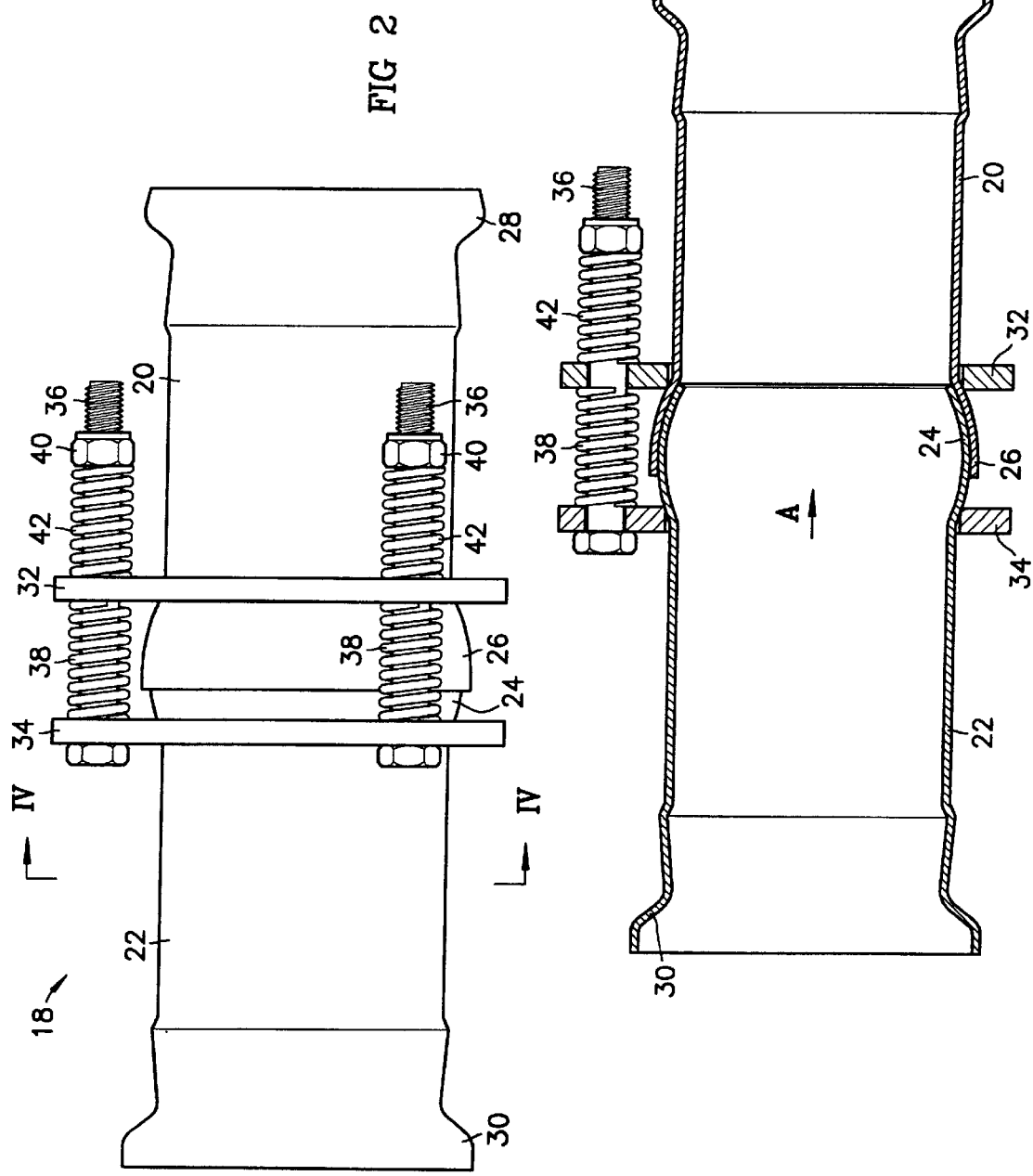

KNUCKLE JOINT FOR AN EXHAUST SYSTEM

This application is a continuation of International Application PCT/GB98/00694 filed Mar. 9, 1998 (pending).

This invention relates to a knuckle joint for an exhaust system.

A knuckle joint is a joint that is used between adjacent segments of the exhaust system of an internal combustion engine, to allow for relative movement between the segments. This is required to prevent cracking and shearing from occurring, especially in the case of vehicle exhaust systems, because of movements that take place as a result of changes in engine torque, gear changes, uneven road surfaces, and so on.

Presently known knuckle joints have first and second pipe segments, the first pipe segment having a first end portion and the second pipe segment having a second end portion which enters with clearance into the first end portion, such as to permit the first and second pipe segments to move with respect to one another, a first flange on the first pipe segment, a second flange on the second pipe segment, and a series of circumferentially spaced threaded bolts passing through corresponding holes in the flanges, each bolt carrying a nut, for drawing the flanges, and thereby the first and second pipe segments, axially together, there being a coil spring on each of the bolts, between the nut and the adjacent flange.

A problem experienced with this type of knuckle joint is that when the nuts are tightened to compress the coil springs, the first end portion is brought up hard against the inside face of the second end portion. The resultant friction makes it difficult for the knuckle joint to flex. Furthermore, there is a tendency for the flanges to bend and for the bolts to break because of the forces involved. Also, as the flanges are welded to the corresponding pipe segments, the degree to which the pipe segments can rotate with respect to one another about the longitudinal axis of the pipe segments is limited.

It is also known, instead of a knuckle joint, to use flexible joints that consist of a helically wound element. In flexible joints of this type the heat of the exhaust gases tends with time to harden the joint where adjacent convolutions of the helically wound element meet, progressively limiting the flexibility and reducing the useful working life of the joint. This problem is experienced particularly if the flexible joint is not installed properly.

According to the present invention there is provided a knuckle joint for an exhaust system, which comprises:

first and second pipe segments, the first pipe segment having a first end portion and the second pipe segment having a second end portion which enters with clearance into the first end portion, such as to permit the first and second pipe segments to move with respect to one another;

a first flange on the first pipe segment;

a second flange on the second pipe segment;

means for drawing the first and second flanges, and thereby the first and second pipe segments, axially together; and a resiliently compressible element between the first and second flanges, said element acting on the flanges to urge the flanges axially apart.

The resiliently compressible element may be in the form of a coil spring.

Said means may comprises a plurality of circumferentially spaced bolts, each bolt passing through a corresponding hole in each of the flanges, and there being a said coil spring on each of the bolts, between the flanges.

At least one of the flanges may be a sliding fit on the corresponding pipe segment.

The first end portion may have a first, circumferentially extending, inwardly facing contact face at or near the free end of the first end portion, and the second end portion a second, circumferentially extending, outwardly facing contact face at or near the free end of the second end portion, there being an annular space between the first and second end portions, and the first and second pipe segments being axially displaceable with respect to one another between a first extreme position in which the second contact face abuts on the inside surface of the first end portion, and a second extreme position in which the first contact face abuts on the outer surface of the second end portion.

The invention extends to an exhaust system for an internal combustion engine, which includes a knuckle joint as outlined above.

The invention will now be described in more detail, by way of example, with reference to the accompanying drawings.

In the drawings:

FIG. 1 diagrammatically illustrates an internal combustion engine and its exhaust system, the exhaust system including a knuckle joint in accordance with the invention;

FIG. 2 is a side view of the knuckle joint;

FIG. 3 is a longitudinal section on III—III in FIG. 4;

FIG. 4 is a cross-section on IV—IV in FIG. 2

FIG. 5 is a diagrammatic cross-section through one side of a vertically mounted knuckle joint in accordance with the invention, showing the parts thereof in one extreme position relative to one another; and FIG. 6 is a view similar to FIG. 5, but showing the parts the other extreme position relative to one another.

Referring first to FIG. 1, reference numeral 10 designates an internal combustion engine (e.g. a diesel engine), and reference numeral 12 its exhaust system, the exhaust system comprising an exhaust manifold 14 and a series of silencer boxes 16.1, 16.2, and 16.3. Between the exhaust manifold 14 and the first silencer box 16.1 there is a kruckle joint 18. The knuckle joint 18 allows relative movement to take place between the exhaust manifold 14 and that part of the exhaust system downstream of the knuckle joint. This serves to isolate the downstream part of the exhaust system from vibrations of the engine and from movement of the engine in its mountings, thus preventing or reducing the incidence o cracking of the manifold, undue stresses on the various parts of the exhaust system, and other problems encountered when a knuckle joint is not fitted.

Turning now to FIGS. 2 to 4, the knuckle joint 18 comprises a first pipe segment 20 and a second pipe segment 22, the second pipe segment having an outwardly deformed end portion 24 which enters into a flared end portion 26 of the first pipe segment 20.

The end portion 24 is deformed in such a mariner that i has a convex outer surface and can enter with a small amount of clearance into the flared end portion 26.

The pipe segment 20 has an end fitting 28 welded thereto and the pipe segment 22 an end fitting 30. The end fittings 28 and 30 enable the knuckle joint to be clamped into position in the exhaust system.

The knuckle joint further comprises a flange 32 on the pipe segment 20 and a flange 34 cn the pipe segment 22. The flange 32 is a sliding fit on the pipe segment 20, so that the flange can slide axially along the pipe segment and can also rotate with respect to the pipe segment about the axial direction. The flange 34 is likewise a sliding fit on the pipe segment 22.

The knuckle joint further comprises three circumferentially spaced threaded bolts 36, each bolt passing through corresponding over-size holes in the flanges 32 and 34. On each of the bolts 36, between the flanges 32 and 34, there is a coil spring 38. Each bolt 36 has a cleave lock nut 40 thereon and a further coil spring 42 between the nut and the flange 32.

When the nuts 40 are tightened, the flanges 32 and 34 are drawn together and the coil springs 38 and 42 compressed. The flange 32 bears on the flared end portion 26 and the flange 34 on the outwardly deformed end portion 24, thereby drawing the pipe segments 20 and 22 together axially until the end portion 24 contacts the inside surface of the flared end portion 26. In this condition the compressive force in the coil springs 38 and 42 is considerable, yet the force whereby the end portion 24 contacts the inside surface of the flared end portion 26 is significantly lower than would have been the case had the coil springs 38 not been present. This is so because the coil springs 38 act on the flanges 32 and 34 to urge them axially apart. This makes it easier for relative movement between the pipe segments 20 and 22 to take place than would have been the case had the coil springs 38 not been present.

The fact that the end portion 24 has a convex outer surface enables the knuckle joint to flex.

Furthermore, the fact that the flanges are a sliding fit on the pipe segments 20, 22 enables the pipe segments to swivel with respect to one another about their longitudinal axis.

The normal direction of flow of exhaust gases is indicated by arrow A in FIG. 3.

When used with an engine that has an exhaust manifold on each opposite side of the engine, the knuckle joint on each exhaust manifold may be mounted so as to extend in a vertical or near-vertical direction. In that event the one knuckle joint may be arranged to have characteristics that differ from those of the other knuckle joint. These characteristics may be such that, when the vehicle is at rest and the engine switched off, the parts of the knuckle joint on the left hand manifold are in the relative positions illustrated in FIG. 5, whereas the parts of the knuckle joint on the right hand manifold are in the relative positions illustrated. in FIG. 6. It is to be noted that the curvature of the parts shown in FIGS. 5 and 6 has been exaggerated for purposes of illustration.

The first portion 26 has a circumferentially extending, inwardly facing contact face 44 at or near the free end thereof, the second end portion 24 has a circumferentially extending, outwardly facing contact face 46, and there is an annular space 48 between the first and second end portions.

The configuration of the first and second end portions is such that the pipe segments 20 and 22 are displaceable with respect to the one another in the axial direction, between a first extreme position in which the contact face 46 abuts on the inside surface of the first end portion (as shown in FIG. 5), and a second extreme position in which the contact face 44 abuts on the outside surface of the second end portion 28 (as shown in FIG. 6).

A knuckle joint for use on the left hand exhaust manifold is provided with relatively short or weak coil springs 38.1 so that, in use, the contact face 46 normally abuts on the inside face of the first end portion 26 (as shown in FIG. 5). A knuckle joint for use on the right hand exhaust manifold is provide with relatively long or strong coil springs 38.2 so that, in use, the contact face 44 normally abuts on the outside surface of the second end portion 28 (as shown in FIG. 6).

When the knuckle joints are newly installed, the following procedure is followed to obtain a deposit of soot on the surfaces defining the annular space 48. The vehicle's engine is started and allowed to idle for a short period of time and then switched off while the knuckle joint is still cold. During this short period some of the exhaust gases enter into the annular space 48, depositing soot on the surfaces defining the annular space of the knuckle joint on the right hand manifold. After the engine has been left to cool down it is again started and, with the hand brake applied, the engine then torqued for a short period of time. This causes the engine to tilt sideways in its mountings, in a clockwise direction, which in turn causes the pipe segments 20 and 22 of the knuckle joint on the left hand exhaust manifold to move from the relative positions shown in FIG. 5 to the relative positions shown in FIG. 6. Soot can now enter into the annular space 48, this time of the knuckle joint the left hand manifold.

The soot that collects on the surfaces defining the annular spaces 48 in this manner forms a deposit that acts as a lubricant between the opposed surfaces and also as a sealant against blowing through of exhaust gases.

What is claimed is:

1. A knuckle joint for an exhaust system, which comprises:

first and second pipe segments which join one another in a gasket-less manner, the first pipe segment having a first end portion and the second pipe segment having a second end portion which enters with clearance into the first end portion, such as to permit the first and second pipe segments to move with respect to one another;

a first radially outwardly extending flange on the first pipe segment;

a second radially outwardly extending flange on the second pipe segment;

means for drawing the first and second flanges, and thereby the first and second pipe segments, axially together; and a resiliently compressible element between the first and second flanges, said element acting on the flanges to urge the flanges axially apart;

the second end portion having a second, circumferentially extending, contact face proximate a free end of the second end portion, whereby the second end portion abuts on an inner surface of the first end portion when the first and second pipe segments are in a first extreme position axially towards one another, and the first and second end portions forming between them an annular space when the first and second pipe segments are in said first extreme position with respect to one another, into which annular space exhaust gases can enter when, during operation, said second contact face moves out of contact with the inner surface of the first end portion, to deposit soot on surfaces that define the annular space.

2. A knuckle joint as claimed in claim 1, wherein the resiliently compressible element is in the form of a coil spring.

3. A knuckle joint as claimed in claim 2, wherein said means comprises a plurality of circumferentially spaced bolts, each bolt passing through a corresponding hole in each of the flanges, and wherein there is a said coil spring on each of the bolts, between the flanges.

4. A knuckle joint as claimed in claim 1, wherein at least one of the flanges is coupled with a sliding fit to the corresponding pipe segment.

5. A knuckle joint as claimed in claim 1, wherein the first and second pipe segments are axially displaceable between said first extreme position and a second extreme position with respect to one another. the first pipe segment having a first, circumferentially extending contact face proximate a free end of the first end portion, whereby the first end portion abuts on the outer surface of the second end portion when the first and second pipe segments are in said second extreme position with respect to one another.

6. An exhaust system for an internal combustion engine, which includes a knuckle joint comprising:

first and second pipe segments which join one another in a gasket-less manner, the first pipe segment having a first end portion and the second pipe segment having a second end portion which enters with clearance into the first end portion, such as to permit the first and second pipe segments to move with respect to one another;

a first radially outwardly extending flange on the first pipe segment;

a second radially outwardly extending flange on the second pipe segment;

means for drawing the first and second flanges, and thereby the first and second pipe segments, axially together; and a resiliently compressible element between the first and second flanges, said element acting on the flanges to urge the flanges axially apart;

the second end portion having a second, circumferentially extending, contact face proximate a free end of the second end portion, whereby the second end portion abuts on an inner surface of the first end portion when the first and second pipe segments are in a first extreme position axially towards one another, and the first and second end portions forming between them an annular space when the first and second pipe segments are in said first extreme position with respect to one another, into which annular space exhaust gases can enter when, during operation, said second contact face moves out of contact with the inner surface of the first end portion, to deposit soot on surfaces that define the annular space.

7. An exhaust system as claimed in claim 6, wherein the first and second pipe segments are axially displaceable between said first extreme position and a second extreme position with respect to one another, the first pipe segment having a first, circumferentially extending contact face proximate a free end of the first end portion, whereby the first end portion abuts on the outer surface of the second end portion when the first and second pipe segments are in said second extreme position with respect to one another.

* * * * *